(12) United States Patent
Weedlun

(10) Patent No.: US 10,994,375 B2
(45) Date of Patent: May 4, 2021

(54) LASER CUTTING WITH FEATURE LOCATION PLACEMENT REGISTRATION

(71) Applicant: Paul Weedlun, Fulton, MD (US)

(72) Inventor: Paul Weedlun, Fulton, MD (US)

( * ) Notice: Subject to any disclaimer, the term of this patent is extended or adjusted under 35 U.S.C. 154(b) by 56 days.

(21) Appl. No.: 16/368,321

(22) Filed: Mar. 28, 2019

(65) Prior Publication Data

US 2019/0299338 A1    Oct. 3, 2019

Related U.S. Application Data

(60) Provisional application No. 62/649,214, filed on Mar. 28, 2018.

(51) Int. Cl.
| | |
|---|---|
| *G05B 19/4155* | (2006.01) |
| *B23K 26/38* | (2014.01) |
| *B23K 26/00* | (2014.01) |
| *B23K 26/03* | (2006.01) |
| *B23K 26/08* | (2014.01) |

(Continued)

(52) U.S. Cl.
CPC .......... *B23K 26/38* (2013.01); *B23K 26/0006* (2013.01); *B23K 26/032* (2013.01); *B23K 26/0344* (2015.10); *B23K 26/042* (2015.10); *B23K 26/0846* (2013.01); *B23K 26/0884* (2013.01); *B23K 26/60* (2015.10); *G05B 19/4155* (2013.01); *G05B 2219/36199* (2013.01)

(58) Field of Classification Search
CPC .. B23K 26/38; B23K 26/0344; B23K 26/042; B23K 26/60; B23K 26/0006; B23K 26/032; B23K 26/0846; B23K 26/0884; G05B 19/4155; G05B 2219/36199

USPC .......................................................... 700/166

See application file for complete search history.

(56) References Cited

U.S. PATENT DOCUMENTS

| | | |
|---|---|---|
| 5,200,592 A | 4/1993 | Yabu |
| 5,614,115 A | 3/1997 | Horton et al. |

(Continued)

*Primary Examiner* — Kenneth M Lo
*Assistant Examiner* — Michael W Choi
(74) *Attorney, Agent, or Firm* — Royal W. Craig; Gordon Feinblatt LLC

(57) ABSTRACT

A galvanometric laser for cutting and/or etching textile embellishments such as transfers or applique's and a method of operation thereof that is capable of visually capturing an incoming graphic image and referencing a cut pattern to the captured image and dynamically adjusting the cut pattern during cutting, etching and/or application of energy from the laser to thereby compensate for distortions in the fabric. The device includes a conveyor with an imaging station at which the graphic product is indexed under a high-resolution static camera with color recognition capability for the purposes of image capture. A high intensity bottoms-up light source resident at the imaging station provides ample illumination regardless of whether the design elements are face up toward the camera or face down toward the light source, or a combination of both. The system includes a computer at which the captured product image is analyzed, and the analytics are used to adjust the input cut file specifying the location and power settings for laser application. The product is then advanced in a controlled manner by means of the conveyor into a galvanometric cutting station where laser energy is applied. After completion the product is advanced out of the galvanometric cutting station for packaging.

7 Claims, 2 Drawing Sheets

(51) Int. Cl.
*B23K 26/60* (2014.01)
*B23K 26/042* (2014.01)

(56) References Cited

U.S. PATENT DOCUMENTS

| | | | |
|---|---|---|---|
| 6,491,361 B1 | 12/2002 | Spann | |
| 9,327,419 B2 | 5/2016 | Gallucci | |
| 2009/0025123 A1* | 1/2009 | Weedlun | B23K 26/389 2/244 |
| 2010/0260378 A1* | 10/2010 | Noy | G06T 7/12 382/103 |
| 2018/0158537 A1* | 6/2018 | Blaine | G12B 13/00 |
| 2018/0302614 A1* | 10/2018 | Toksvig | G06T 19/00 |

* cited by examiner

LASER CUTTING WITH FEATURE LOCATION PLACEMENT REGISTRATION

CROSS-REFERENCE TO RELATED APPLICATION(S)

The present application derives priority from U.S. Provisional Patent Application 62/649,214 filed 28 Mar. 2018.

BACKGROUND OF THE INVENTION

1. Field of the Invention

The present invention relates generally to laser technology and, more particularly, to a galvanometric laser capable of visually capturing an incoming graphic image, referencing the image, and based on the reference adjusting he beam while cutting, etching and/or application of energy from the laser precisely relative to a graphic previous created and defined through printing or layering of materials or placement of stitches or other means.

2. Description of the Background

There is a substantial commercial demand for textile embellishments either for fashion or branding purposes. Some are printed by sublimating dyes or inks onto woven or knit fabrics and non-woven webs, others have graphic images stitched or appliqued on, which inherently have variability due to the nature of fabric structures and processing inconsistencies in fabric formation, sublimation process, stitching and lamination process.

Due to the high temperatures required to sublimate dyes into polyester materials the process is normally done on conventional calendars which consist of a heated drum and utilize a single belt, normally DuPont Nomex® or felt, to convey the fabric and printed sublimation transfer paper. The fabric is exposed to the heated drum for a period of time and at a temperature where sublimation can occur. Most fabric will shrink during this process. Moreover, woven and knitted fabrics have inherent tension imparted during the weaving and knitting process, and yarn tends to come off of warps or packages.

During embroidery tensions often change as yarn runs down on cones or bobbins run down or as the density of stitching impacts the material base creating tension. During lamination processes application of heat and the introduction of adhesives adds further elements of variability and can magnify the impacts of tensions differences as shrinkage occurs from exposure to heat.

It is often desirable to cut multiple elements out of the fabric in registration, and print or etch the fabric surfaces or apply treatments or adhesives while maintaining registry of the multiple individual elements. Conventional lasers may have the capability to register the overall graphic and then use the registry to apply energy from the laser. For example, there are lasers with camera systems that scan graphical images and can dynamically adjust during execution of a static cut file. The majority of these systems are used on XY plotter lasers and more recently galvanometric lasers.

For example, Golden Laser's Flying Scan Vision laser cutting machines use cameras to scan the fabric, detect and recognize printed contour, or pick up on printed registration marks and cut the chosen designs with speed and accuracy. Similarly, Gbosh creates scans of images to establish referencing but both use static cut files and employ best fit algorithms to make a best fit cut.

U.S. Pat. No. 5,614,115 to Horton et al. (CadCam Technologies) issued Mar. 25, 1997 shows a computer-controlled galvanometric laser with imager for recognizing the shape or a pattern marked on the material. The device uses a fixed laser with a mirror-focus (galvanometric) for cutting and/or etching textile embellishments such as transfers or applique's. The system includes a computer programmed to analyze the scan results to construct a computer image of the pattern marked on the sheet material. The program includes image recognition and image enhancement algorithms, permitting the computer to make an intelligent assessment of the desired shape or pattern to be cut from the sheet material. However, the CadCam relies on reference marks.

U.S. Pat. No. 5,200,592 to Yabu (Juki Corp.) issued Apr. 6, 1993 shows a non-imaging mirror-focus (galvanometric) laser cutting apparatus for cloth in which the fabric is cut on a cutting table the top surface of which is a belt conveyor.

U.S. Pat. No. 9,327,419 to Gallucci issued May 3, 2016 shows an apparatus for cutting and/or etching articles comprising two separate imagers, one for detecting designs and/or writings reproduced on the articles when the articles are arranged on the cutting bed; and the other to detect the orientation as well as the position of the articles on the cutting bed. The claims require the second optics to be at a height greater than the first optics with respect to the work surface, and can be avoided by use of a single scanner and or multiple scanners at the same elevation.

U.S. Pat. No. 6,491,361 to Spann (Encad, Inc.) issued Dec. 10, 2002 shows an integrated laser cutter/printer. The printer may be an ink jet type and the application of laser light may be controlled digitally along with the ink droplet ejection. The media may be cut or etched with the laser, or heat may be applied to previously deposited ink.

It is therefore desirable to be able to apply the laser energy on materials with graphics that have variations or distortions as a result of the manufacturing process. The laser is indexed to the existing graphics for tasks such as cutting or etching the products and or to fusing or activating material to or on to the product.

SUMMARY OF THE INVENTION

It is an object of the present invention to provide a galvanometric laser system and method capable of capturing and processing an image, account for distortions in images from the actual graphic caused by manufacturing distortions and modify the application of the laser energy from the pre-established locations in the graphic file to the appropriate location or reference, accounting the actual graphic.

In accordance with the foregoing objects, the invention is a galvanometric laser for cutting and/or etching textile embellishments such as transfers or applique's and a method of operation thereof that is capable of visually capturing an incoming graphic image and referencing a cut pattern to the captured image and dynamically adjusting the cut pattern during cutting, etching and/or application of energy from the laser to thereby compensate for distortions in the fabric.

The method used for application of laser energy to product surfaces is to first scan a produced surface to capture the actual location of applied elements such as printing or stitching onto a surface of a material. The actual image is analyzed and then corrections are made to the input reference graphical files for the purpose of applying laser energy to the proper location on the material in registration to the actual elements produced in prior manufacturing steps. These materials are then transported into the galvanometric laser housing by means of a conveyor. Laser energy is then applied by means of a galvanometric laser head at the intended power settings to cut, etch or activate materials in the desired locations. The product is than advanced after completion of the application of laser power for packaging or subsequent processing.

The device includes a conveyor with an imaging station at which the graphic product is indexed under a high-resolution static camera with color recognition capability for the purposes of image capture. A high intensity bottoms-up light source resident at the imaging station provides ample illumination regardless of whether the design elements are face up toward the camera or face down toward the light source, or a combination of both. The system includes a computer at which the captured product image is analyzed, and the analytics are used to adjust the input cut file specifying the location and power settings for laser application. The product is then advanced in a controlled manner by means of the conveyor into a galvanometric cutting station where laser energy is applied. After completion the product is advanced out of the galvanometric cutting station for packaging or subsequent processing.

The improved method and machine applies laser energy with greater precision and speed than previous methods known in the art. The resulting products have precision cuts, etching or conversion of materials through application of laser energy onto the desired locations and creating the desired shapes accounting for deviations in product due to manufacturing variability.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a system and process for producing textile products that require precise application of laser energy to transform or cut through materials.

Figure 1:
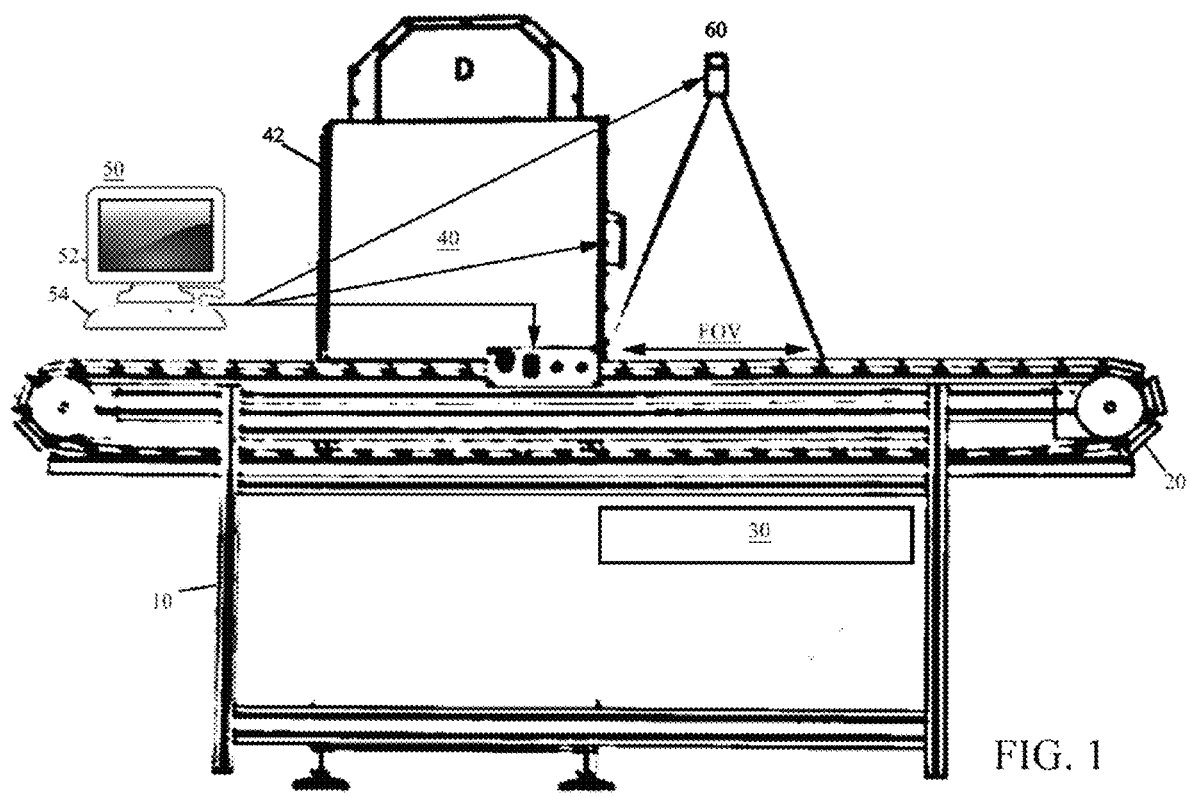
FIG. 1 shows a partial side plan view of the described invention.

FIG. 1 is a partial side plan view of the described invention. As shown in FIG. 1, the system generally includes a freestanding floor stand 10 supporting a horizontal conveyor 20 at approximately waist height. A high-intensity light source 30 is mounted beneath the conveyor 20 to one side of the conveyor 20. Light source 30 may be an emitter of high-intensity white light over a rectangular scanning geometry, such as a rectangular array of Cree™ LEDs. An imager 60 is mounted directly above the conveyor 20 and light source 30. The imager 60 is preferably a high-resolution digital camera with an 8 mm zoom lenses, which provides a FOV of about 40 degrees which allows a higher resolution capture of an imaging square which can be zoomed in on at the center of the shot. A suitable camera is an AXIS® P3915-R with 1080p resolution producing images with 1920×1080 pixels per unit.

The conveyor 20 is an endless-belt-type conveyor with a carrier belt made of rubber reinforced by steel.

The system includes a galvanometric laser cutting/etching/marking machine 40 that uses high-speed, motor-driven mirrors to steer a laser beam through a lens to a cutting field on conveyor 20. The cutting field is preferably rectangular and identical in size to the camera FOV. Since there are no movable parts (with the exception of the mirrors) the laser beam can be guided over the cutting field at extremely high speeds with high precision and repeatability. The galvo laser 40 is enclosed within a Class 2 enclosure that shrouds the cutting field atop conveyor 20. The galvo laser 40 preferably employs X and Y scanning mirrors defining X and Y laser beam positions on the marking plane and directly corresponding to signals taken from X and Y galvanometric motors controlled by X and Y control signals. Suitable galvo lasers 40 inclde Trotec™ galvo laser marking workstations with cutting fields up to 19.7×19.7 inches (500×500 mm) using $CO_2$ lasers.

The system is controlled by a computer 50 inclusive of a keyboard 52 and a display screen 54, the computer being in communication with the conveyor 20 controller, imager 60 and galvo laser 40.

With reference to FIG. 1, the graphic product would advance through the system from right to left on conveyor 20 to the imaging station FOV, at which point the graphic product is photographed and indexed by high-resolution imager 60. The high intensity bottoms-up light source 30 resident below the imaging station FOV provides ample illumination regardless of whether the design elements of the product are face up toward the imager 60 or face down toward the light source 30, or a combination of both. The computer 50 analyzes the captured product image and the analytics are used to adjust the input cut file specifying the location and power settings for laser 40 application. The product is then advanced in a controlled manner by means of the conveyor 20 into the galvanometric laser 40 to the cutting station where laser energy is applied. After completion the product is advanced out of the galvanometric cutting field for packaging or subsequent processing.

Figure 2:
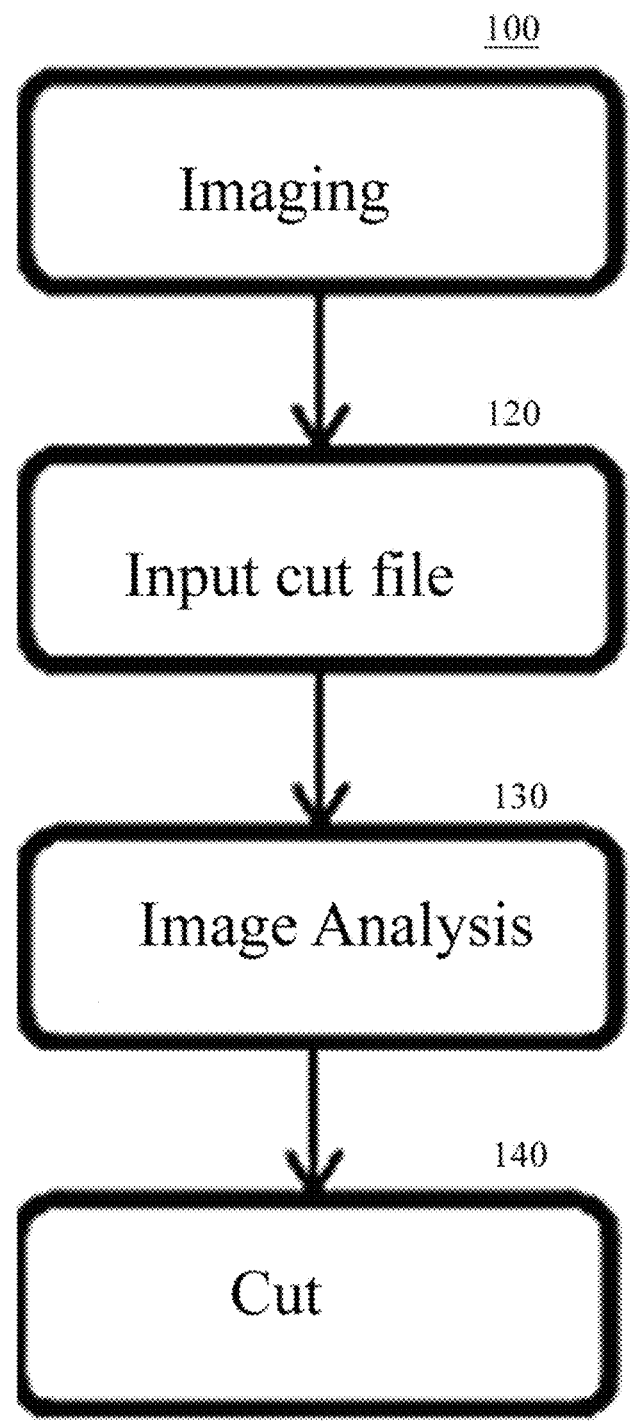
FIG. 2 is a block diagram of the method of the described invention.

FIG. 2 is a detailed block diagram of the process of the invention. Step 100 is an imaging step where the graphic product is imaged and indexed by high-resolution imager 60 as it sits atop conveyor 20 in the imaging station FOV with high intensity bottoms-up light source 30 illuminating below the imaging station FOV. In an embodiment, the image data is coded and compressed to a prescribed number of colors, e.g., 256 colors and a RGB raster image file is established within a three-dimensional field of reference.

At step 120 a separate cut file (or "peripheral lines" file) is input to computer 50 for cutting the product and, if desired, a separate etch file for etching.

Step 130 is an image analysis step wherein computer 50 analyzes the captured product image and cut file and the analytics are used to adjust the input cut file specifying the location and power settings for laser 40 application. The image analysis step uses feature-recognition software to examine the actual location of product elements such as printing or stitching on the surface of the material. The feature recognition software identifies the shape/position of known print features such as print elements, colors, stitches, or the like. The automated feature recognition algorithm may be any one of the three existing algorithmic approaches for feature recognition: graph-based algorithms, volumetric decomposition techniques, and hint-based geometric reasoning. Each identified product feature is recorded and indexed at a fixed position within the FOV. The recorded features are analyzed and then corrections are made to the input reference graphical files based on the recorded and indexed fixed position within the FOV for the purpose of applying laser energy to the proper location on the material in registration to the actual elements produced in prior manufacturing steps. At step 140 the product is then advanced in a controlled manner by means of the conveyor 20 into the galvanometric laser 40 to the cutting station where laser energy is applied and the adjusted cut file is executed.

At step 150 after completion the product is advanced out of the galvanometric cutting field for packaging or subsequent processing.

The improved method and system applies laser energy with greater precision and speed than previous methods known in the art. The resulting products have precision cuts, etching or conversion of materials through application of laser energy onto the desired locations. The foregoing device and process may be used to decorate or transform physical properties of small quantities of products, as well as large quantities. The above device and process significantly reduces the time and improves the precision for cutting, etching or activating materials using laser energy on products that can be distorted during their manufacturing processes.

The above-described embodiment is for the purpose of promoting an understanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

What is claimed is:

1. A method of cutting and etching textiles having graphic elements thereon, comprising the steps of:
    placing a graphic product on a conveyor;
    conveying said graphic product on said conveyor to an imaging station;
    illuminating said imaging station from beneath said conveyor;
    imaging said graphic product as it sits atop said conveyor in the imaging station with high intensity bottoms-up light;
    storing an RGB raster image file of said graphic product within a three-dimensional frame of reference;
    inputting a separate cut file for laser cutting of said graphic product;
    analyzing the stored RGB raster image file by feature-recognition software comprising computer instructions stored on non-transitory media for identifying an actual product feature within the RGB raster image file and an actual location of said identified product feature within said three-dimensional frame of reference, and adjusting said input cut file dynamically in registration to the actual location of said identified product feature within said three-dimensional frame of reference;
    advancing said graphic product on said conveyor to a galvanometric laser cutting station;
    applying laser energy to said graphic product in accordance with said adjusted cut file; and
    advancing said graphic product out of the galvanometric cutting station on said conveyor for packaging.

2. The process according to claim 1, wherein said conveyor is a belt conveyor.

3. The process according to claim 1, further comprising a step of inputting a separate etch file for laser etching of said graphic product.

4. A galvanometric laser system for cutting and etching textile embellishments, comprising:
    a continuous linear conveyor;
    an imaging station along said conveyor;
    a high-resolution color camera above the image station of said conveyor;
    a high intensity bottoms-up light source beneath the imaging station of said conveyor;
    a cutting station along said conveyor downstream of said imaging station;
    a galvanometric laser cutting system for applying laser energy at said cutting station; and
    a computer including a processor and non-transitory computer memory, and software stored on said computer memory for inputting a cut file for laser cutting of said graphic product, capturing an RGB raster image of said graphic product from said high-resolution color camera, analyzing said RGB raster image from said high-resolution color camera, identifying a feature of said RGB raster image relative to a frame of reference by feature-recognition, calculating an offset parameter based on a location of said identified feature within said frame of reference, and adjusting said input cut file dynamically by said offset parameter.

5. The galvanometric laser system according to claim 4, wherein said continuous linear conveyor is a belt conveyor.

6. The galvanometric laser system according to claim 4, wherein said high intensity bottoms-up light source comprises an LED array.

7. The galvanometric laser system according to claim 4, wherein said computer is in communication with said galvanometric laser cutting system.

\* \* \* \* \*